(12) United States Patent
Liu et al.

(10) Patent No.: US 6,937,486 B2
(45) Date of Patent: Aug. 30, 2005

(54) METHODS AND CONTROLLERS FOR SUPPRESSING DC MAGNETIC DEFLECTION OF TRANSFORMER

(75) Inventors: Teng Liu, Taoyuan Shien (TW); Xingkuan Guo, Taoyuan Shien (TW); Jianping Ying, Taoyuan Shien (TW); Jianhong Zeng, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 19 days.

(21) Appl. No.: 10/916,306

(22) Filed: Aug. 11, 2004

(65) Prior Publication Data

US 2005/0036341 A1 Feb. 17, 2005

(30) Foreign Application Priority Data

Aug. 11, 2003 (TW) .................................. 92122035 A

(51) Int. Cl.⁷ ................................................ H02M 1/12
(52) U.S. Cl. ........................................................ 363/41
(58) Field of Search .............................. 363/40, 41, 39

(56) References Cited

U.S. PATENT DOCUMENTS 4,858,094 A * 8/1989 Barlage .................... 363/21.16
5,376,872 A * 12/1994 Hara .......................... 318/799

* cited by examiner

*Primary Examiner*—Shawn Riley
(74) *Attorney, Agent, or Firm*—Volpe and Koenig, P.C.

(57) ABSTRACT

The power converters employing the provided methods and controllers are proposed. The controller includes: a signal preprocessor for generating a current signal according to a sensed current of the transformer, an integrator electrically connected to the signal preprocessor for integrating the current signal and offering an integrated signal, a synthesizer electrically connected to the integrator for receiving and synthesizing the integrated signal and a slope compensation signal to generate a synthesized signal, an operational amplifier of a control loop for generating an amplified error signal, and a PWM comparator electrically connected to the operational amplifier and the synthesizer for comparing the amplified error signal and the synthesized signal and generating a PWM signal to turn on and off a switch of the transformer accordingly.

14 Claims, 7 Drawing Sheets

METHODS AND CONTROLLERS FOR SUPPRESSING DC MAGNETIC DEFLECTION OF TRANSFORMER

FIELD OF THE INVENTION

The present invention relates to the field of power converters. More specifically, this invention relates to the apparatuses for suppressing the DC magnetic deflection of the power transformer and the power converters employing the proposed methods and apparatuses.

BACKGROUND OF THE INVENTION

Usually, power converter circuits are employed to transform certain input voltage waveforms into specified output voltage waveforms. In many occasions, the input DC voltages are transformed into desired output DC voltages, and the output voltages could be higher or lower than the input voltages. The typical applications of these converters include the power sources of communication systems and computers. Please refer to FIG. 1, it is the schematic circuit diagram of a typical full-bridge DC/DC converter in the prior art. In which, it includes four controllable switches (Q1 to Q4, usually MOSFETs), a power transformer (T1, usually an isolated transformer), output rectifier unit, and output filter (Lf and Co). There is also a controller for controlling the four controllable switches.

When the full-bridge DC/DC converter is operated, the two diagonal switches are alternately turned on and off according to specified duty ratio, and the AC voltage is added to the primary side winding of the transformer. When the AC voltage is transferred to the secondary side of the transformer and sent through the rectifying unit and the output filter, the AC voltage is transformed into the desired DC voltage. When the input DC voltage and the output current are changed, the controller are employed to monitor the output voltage, adjust the duty ratio of the two diagonal switches, adjust the amount of the rms of the AC component processed by the transformer, and accomplish the adjustment of the output voltage lastly.

However, it is quite easy to generate the volt-sec unbalancing phenomenon due to the deviation of the controller, and as a result the transformer would suffer from the DC magnetic flux. The volt-sec unbalancing means that there are DC voltage components added to the iron core of the transformer. The difference between the duty ratios of the control signals of the controllable switches and the unsymmetry of the voltage drops of the turned on controllable switches are factors which will cause the unbalancing of the volt-sec. After several periods of switching, continuously increased magnetic flux will cause the transformer to be saturated, and cause the power converter to become failed lastly.

The full-wave rectifier is usually employed as the output rectifier unit of the full-bridge DC/DC converter. The advantages of this method include that only one output inductor is required, and the DC component of the secondary side can be neglected. This method is widely used while the output current is not relatively quite large.

In the prior art, the method of coupling DC blocking capacitor to the primary side of the transformer is usually employed to solve the DC component problem of the full-bridge DC/DC converter as shown in FIG. 2. In which, Cb is the DC blocking capacitor, and the circuit of the secondary side is not shown. The principles of the aforementioned method are: 1. if the DC blocking capacitor Cb is not existed, there is DC component on the primary side of the transformer; and 2. if the DC blocking capacitor Cb exists, there is a DC voltage across Cb, and the effects of the DC component will trade off the DC current of the primary side. There is no DC current across the capacitor in the steady state. Otherwise, the capacitor voltage will be increased unlimited. Thus, there is no DC component on the primary side of the transformer coupled to the capacitor in series. The advantages of this alternative are: it is relatively simple, feasible, and more reliable. The disadvantages are: 1. the voltage across the capacitor Cb should be relatively smaller to keep the original features of the circuit, which means that the capacitance of the DC blocking capacitor should be relatively larger; 2. this will increase the complexity of the circuit and the relative costs of the system; 3. the volume of the system is increased, and hampered the increasing of the power density of the converter. Surely, the capacitance of that capacitor could be decreased properly under certain application occasions. But for these certain occasions, the DC blocking capacitor has other negative influences. For example, the DC voltage across the DC blocking capacitor of the commonly used phase-shifted full-bridge DC/DC converter will cause the inconsistence of the soft-switching conditions of the circuit according to the analyses. Under certain conditions, it is possible that the system would be damaged due to the over-heating.

Except for employing the DC blocking capacitor to remove the DC component on the primary side of the transformer, there is another alternative which is feasible theoretically. Since the DC component will cause the transformer to be saturated due to the magnetic flux, the result caused by the saturation of the transformer will be the dramatically increasing of the current on the primary side, and the power switch on the primary side will be damaged lastly. Therefore, a feasible alternative is to increase the air gap of the transformer, thus the transformer can stand relatively larger DC current and could not be saturated easily, and the switches of the circuit will not be damaged due to the over-current. But the introduce of the air gap will decrease the exciting inductance of the transformer, and increase the exciting current. This will cause the copper losses on the primary side of the transformer to be increased, which is equivalent to that the AC impedance of the primary side winding is increased. Finally, the efficiency of the converter is relatively low. It can be seen that the relatively less air gap is desired for the higher efficiency, but the relatively less air gap will cause the transformer to be saturated more easily.

Keeping the drawbacks of the prior arts in mind, and employing experiments and research full-heartily and persistently, the methods and controllers for suppressing DC magnetic deflection of transformer are finally conceived by the applicants.

SUMMARY OF THE INVENTION

It is therefore an object of the present invention to propose the methods and apparatuses for suppressing the DC magnetic deflection of the transformer, and the power converters employing the proposed methods and apparatuses.

According to the first aspect of the present invention, the controller for suppressing a DC magnetic deflection of a transformer includes: a signal preprocessor for generating a current signal according to a sensed current of the transformer, an integrator electrically connected to the signal preprocessor for integrating the current signal and offering an integrated signal, a synthesizer electrically connected to the integrator for receiving and synthesizing the integrated signal and a slope compensation signal to generate a synthesized signal, an operational amplifier of a control loop for generating an amplified error signal, and a PWM comparator electrically connected to the operational amplifier and the synthesizer for comparing the amplified error signal and the synthesized signal and generating a PWM signal to turn on and off a switch of the transformer accordingly, thereby suppressing a DC current component of the transformer so as to suppress the DC magnetic deflection.

Preferably, the current of the transformer is a current on a primary side of the transformer.

Preferably, the control loop is one of a voltage-control loop and a current-control loop.

Preferably, the slope compensation signal is a saw tooth wave.

Preferably, the synthesizer is an adder.

Preferably, the controller is used in a power converter.

According to the second aspect of the present invention, the controller for suppressing a DC magnetic deflection of a transformer includes: a signal detector for detecting a current of the transformer, an integrator electrically connected to the signal detector for integrating the current and offering an integrated signal, an operational amplifier of a control loop for offering an amplified error signal, a synthesizer electrically connected to the operational amplifier for receiving and synthesizing the integrated signal and a slope compensation signal to generate a synthesized signal, and a PWM comparator electrically connected to the integrator and the synthesizer for comparing the integrated signal and the synthesized signal and generating a PWM signal to turn on and off a switch of the transformer accordingly, thereby suppressing a DC current component of the transformer so as to suppress the DC magnetic deflection.

Preferably, the current of the transformer is a current on a primary side of the transformer.

Preferably, the control loop is one of a voltage-control loop and a current-control loop.

Preferably, the slope compensation signal is a saw tooth wave.

Preferably, the synthesizer is a subtractor.

Preferably, the controller is used in a power converter.

According to the third aspect of the present invention, the method for suppressing a DC magnetic deflection of a transformer includes the steps of: detecting a current of the transformer to generate a current signal; integrating the current signal to offer an integrated signal; offering a slope compensation signal; synthesizing the integrated signal and the slope compensation signal to generate a synthesized signal; offering an amplified error signal of a control loop; and comparing the amplified error signal and the synthesized signal to generate a PWM signal so as to turn on and off a switch of the transformer accordingly, thereby suppressing a DC component of the transformer so as to suppress the magnetic reflection of the transformer.

According to the fourth aspect of the present invention, the method for suppressing a DC magnetic deflection of a transformer includes the steps of: detecting a current of the transformer to generate a current signal; integrating the current signal to offer an integrated signal; offering an amplified error signal of a control loop and a slope compensation signal; synthesizing the amplified error signal and the slope compensation signal to generate a synthesized signal; and comparing the integrated signal and the synthesized signal to generate a PWM signal so as to turn on and off a switch of the transformer accordingly, thereby suppressing a DC component of the transformer so as to suppress the magnetic reflection of the transformer.

The present invention may best be understood through the following descriptions with reference to the accompanying drawings, in which:

DETAILED DESCRIPTION OF THE PREFERRED EMBODIMENT

The principles of the present invention are: 1. measuring the transient current to get the signal corresponding to the DC component of the primary side of the transformer, 2. handling quickly, and 3. adjusting the duty ratios of the switches transiently, and 4. suppressing the DC component of the primary side of the transformer.

Figure 3:
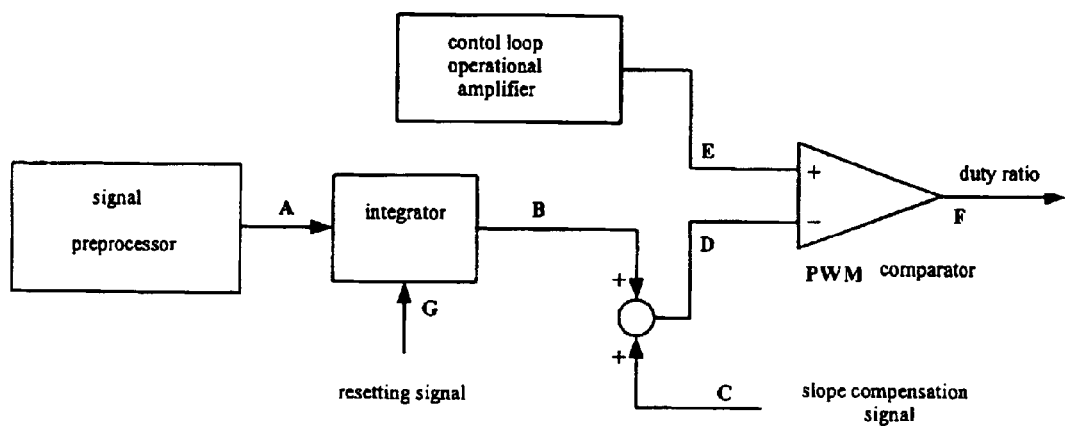
FIG. 3 is the control block diagram of the preferred embodiment of the present invention for suppressing the DC component.

The operational principles of the present invention are analyzed as follows. Please refer to FIG. 3, which shows the control block diagram of the preferred embodiment of the present invention for suppressing the DC component. In which, Signal A is the preprocessed result of the current sampling (or the result of the partially sampling). Signal A can be employed to realize the unsymmetry of the positive and negative currents on the primary side of the transformer. Signal B is the integrated result of signal A. The sum of signal B and signal C (signal D) is compared with the output E of the operational amplifier of the control loop of the traditional circuit, and the output F of the comparator will decide the duty ratio of the power output. Due to the frequency of the power output of the full-bridge DC/DC converter is usually twice the switching frequency of the primary power switches, the currents on the primary side of the transformer are respectively one positive and one negative which are corresponded to the two power outputs within a switching period of the converter. Thus, the DC component of the current on the primary side can be controlled effectively through adjusting the duty ratios of the two power outputs during the converter switching-period. In FIG. 3, signal G is a resetting signal of the integrator, and can be employed to keep the integrator at the starting point of the integral. Signal G is a spike, and its frequency can be twice the switching frequency of the switches. In which, the sum of signals B and C is compared with signal E, or alternatively the difference of signal E and signal C can be compared with signal B, or the difference of signals E and B can be compared with signal C alternatively.

Figure 4:
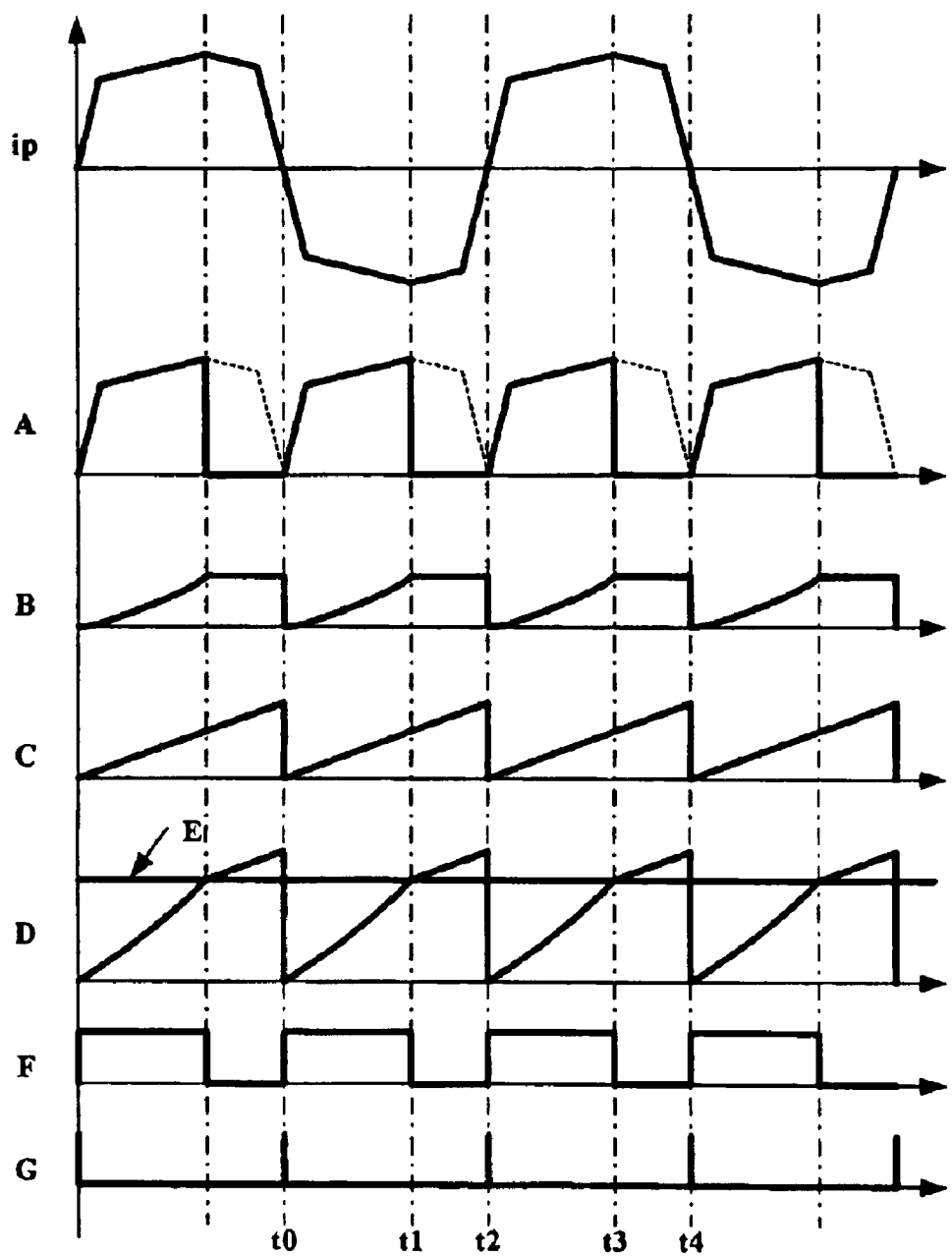
FIG. 4 is the waveform diagram which respectively shows the waveforms corresponding to the control points in FIG. 3 when there is no DC component.

To analyze the principles of controlling the preferred embodiment of the present invention for suppressing DC component further, it is necessary to look at the waveforms corresponding to the control points as shown in FIG. 3 when there is no DC component as can be seen in FIG. 4 (FIG. 4 is the typical waveforms corresponding to the control block diagram, and there exist differences between these waveforms and the real applications due to the differences of control). In which, ip is the waveform of the current on the primary side of the transformer, and the waveform of the current on the primary side of the transformer of the phase-shifted full-bridge DC/DC converter is employed as an example. Waveforms A, B, C, D, E, F, and G are corresponded to the signals as indicated in FIG. 3. Waveform A (in real line) is a portion of the absolute value of the waveform ip (since the sampling signal could be one of the current, the completely sampling, and the partially sampling). Waveform B is the integrated result of signal A through the integrator. Referring to the waveform of the resetting signal G, it can be seen that waveform B is always be effectively reset at the specified moment, and the power level of signal B would drop to zero (for the real applications, it can be a certain specified voltage level). Waveform C is the saw tooth compensation waveform, it can make the system to be operated more stably, and the minimum value of the waveform may not be zero. Waveform D is the sum of the waveform B and waveform C (can be the result of the weighed sum in real applications). Waveform E is the outputs of the amplified error signals of the operational amplifier, and the operational amplifier is corresponded to the voltage-loop or current-loop of the power converter. Waveform F is the result of comparing between waveforms D and E, it can be sent to the other portions of the control circuit, and its duty ratio reflects the duty ratio of the desired power outputs. Waveform F corresponds to the current on the primary side of the transformer according to the time. For example, in t0–t2 time period, the duty ratios of waveform F actually decides the duty ratios of the power outputs in that time period, and in t0–t1 time period of FIG. 4, it can be realized as the time period for outputting the power of the phase-shifted full-bridge DC/DC converter (in real applications, the time period for outputting the power would be less than that time period due to the duty cycle loss).

It can be seen that the symmetrical waveform ip generates the waveform F having the same duty ratio as ip, and which explains that this control alternative can work theoretically.

Figure 1:
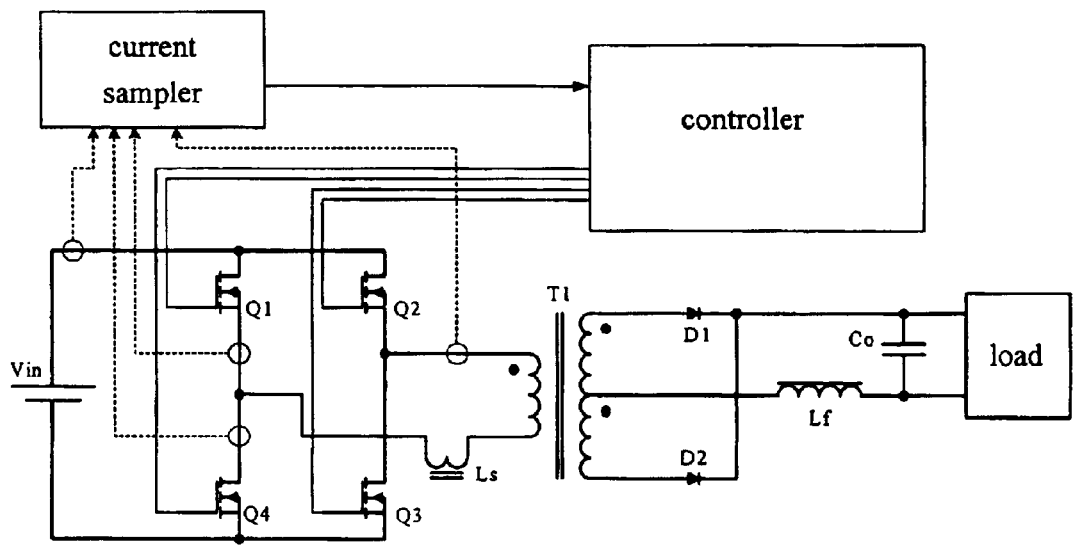
FIG. 1 is the schematic circuit diagram of a typical full-bridge DC/DC converter without DC blocking capacitor in the prior art.
Figure 2:
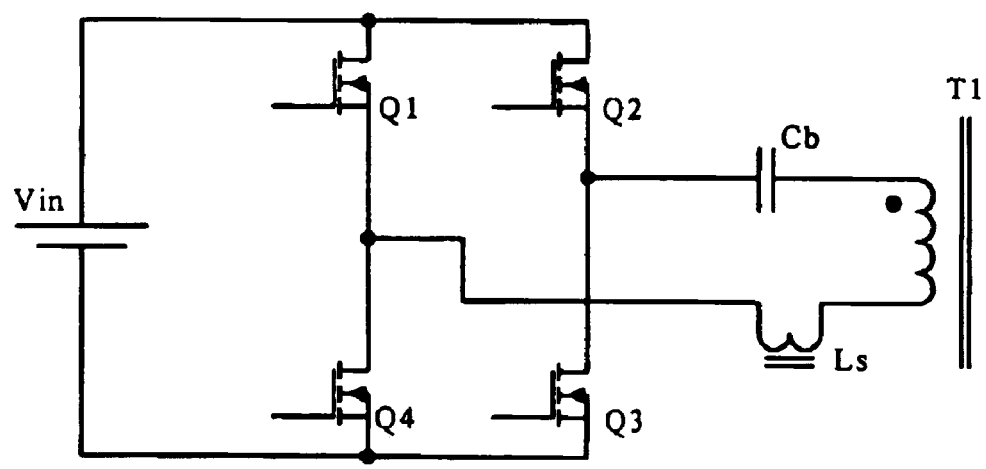
FIG. 2 is the schematic circuit diagram of a typical full-bridge DC/DC converter having a DC blocking capacitor coupled in series in the prior art.

But in the typical applications of FIG. 1, the problem of the DC component of the primary side current is usually quite serious due to the errors of the control circuit, the time delay of the driving circuit, and the unsymmetry of the main power switches while there is no DC blocking capacitor. However, when the DC component suppressing controller as shown in FIG. 3 is added to the original control circuit, the circumstances are totally different. This control method employs the real current sampling waveform to judge the existence of the DC component, and combines the quick response and the strong suppressing of the interference so as to effectively suppressing the DC component of the primary side current. The procedures for suppressing the DC component in the present invention are analyzed according to the waveforms of FIG. 5 as follows.

Figure 5:
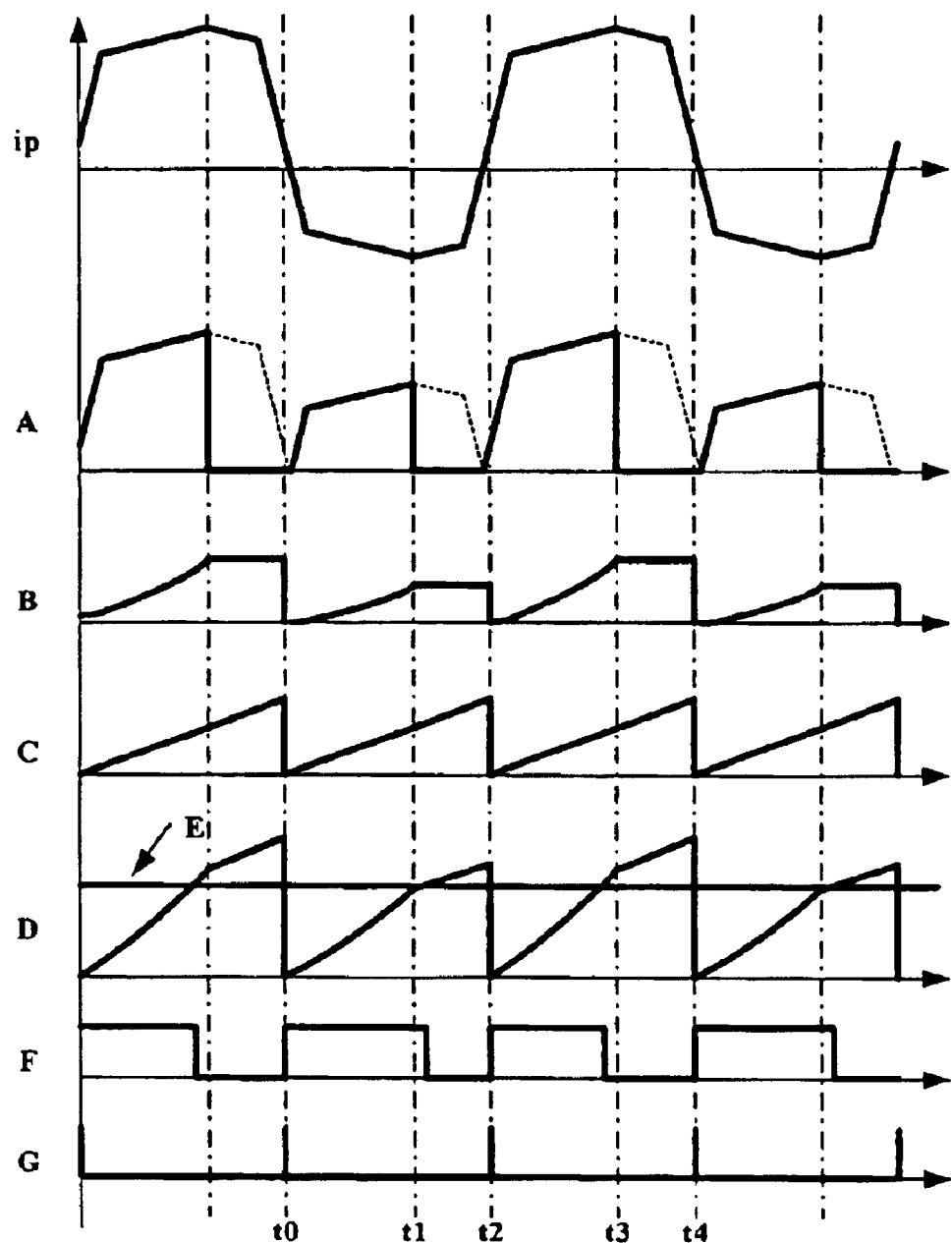
FIG. 5 is the waveform diagram which respectively shows the waveforms corresponding to the control points in FIG. 3 when the DC components are suppressed.

The waveforms of FIG. 5 have the corresponding definitions as those of FIG. 4, which reflect how this control alternative works when there exists DC component on the primary side of the transformer. When there exists DC component of the waveform ip, the positive and negative portions are shown unsymmetry in FIG. 5. Waveform A will be varied according to the waveform of ip, and will reflect the unsymmetry of the current of ip. In FIG. 5, the waveforms of the two wave peaks in one switching period have different altitudes, and the higher wave peak corresponds to the primary side current is relatively higher in certain direction at this moment. As can be seen in FIG. 5, waveform B is the integral of the waveform A, and the integrated voltages also have different altitudes. When the saw tooth wave C is unchanged, the sum of waveforms B and C, waveform D, will generate the circumstances of having highs and lows. Waveform D is compared with the output signal of the operational amplifier, E, to generate the duty ratio of the power output as reflected by the waveform F. Observed the waveforms of F and A correspondingly and referred to the operational status of FIG. 4, it can be seen that the duty ratio of the power outputs will be adjusted automatically when the DC component is appeared on the primary side current. When the DC component exists on the certain direction, the duty ratio of the power output of the corresponding direction will be decreased, the duty ratio of the other direction will be increased, and the DC component of the primary side will be quickly suppressed. When the proposed controller is operated under real circumstances, the waveforms of FIG. 5 might not exist, since the waveforms ip and F are synchronous in time, the quickness of the control can be shown more clearly after using synchronized waveforms, and duty ratio of the power output can be adjusted according to the primary side current in half of the switching period of the converter. In FIG. 5, these waveforms are not shown as synchronized so as to facilitate the explanation of the problems such that the varied trend of the waveform F can be observed more easily.

There is one more unique feature of the present invention that is the DC component suppressing control has relatively stronger capability to suppress the interference, which is accomplished in the integrated control. For example, if there exist spikes of the primary side current, there will be spikes in waveform A after a relatively simple processing is added to waveform C directly, usually the waveform D will have the interference also, and this will influence the stability of the converter (there were similar control circuits proposed before). For decreasing the interference, the signal filtering could be employed, and the signal filtering will bring the problems of time delay and the losses of the effective signals. Employing the integral method will generate the relatively stronger suppressing capability to the interference. When it is under the real operation, waveform ip has the commonly observed current spikes caused by the reverse recovery of the output diodes, and this control circuit can be operated normally.

The operational principles of the present invention are described as aforementioned. It can be seen that the DC component suppressing control has a relatively quick response, and has a relatively stronger suppressing capability to the interference.

The preferred embodiments of the present invention are described as follows. An integral type DC component suppressing method and the converters and systems, which employ the proposed controlling alternative, are proposed in the present invention. Thus, there are many preferred embodiments.

Figure 6A:
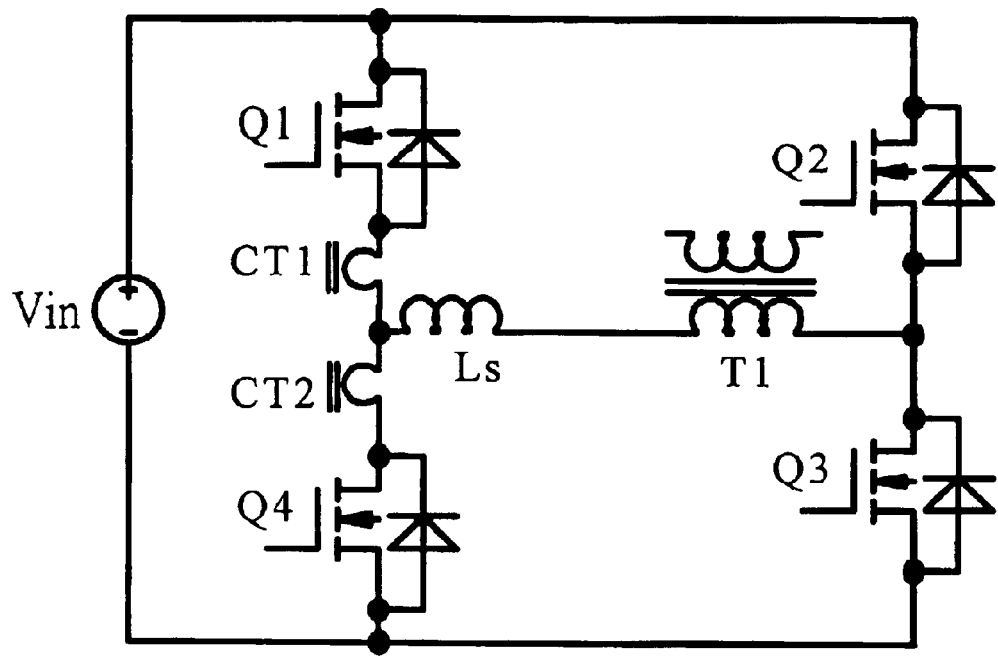
FIG. 6(a) is the schematic circuit diagram of the preferred embodiment of the primary side of the phase-shifted full-bridge DC/DC converter of the present invention.
Figure 6B:
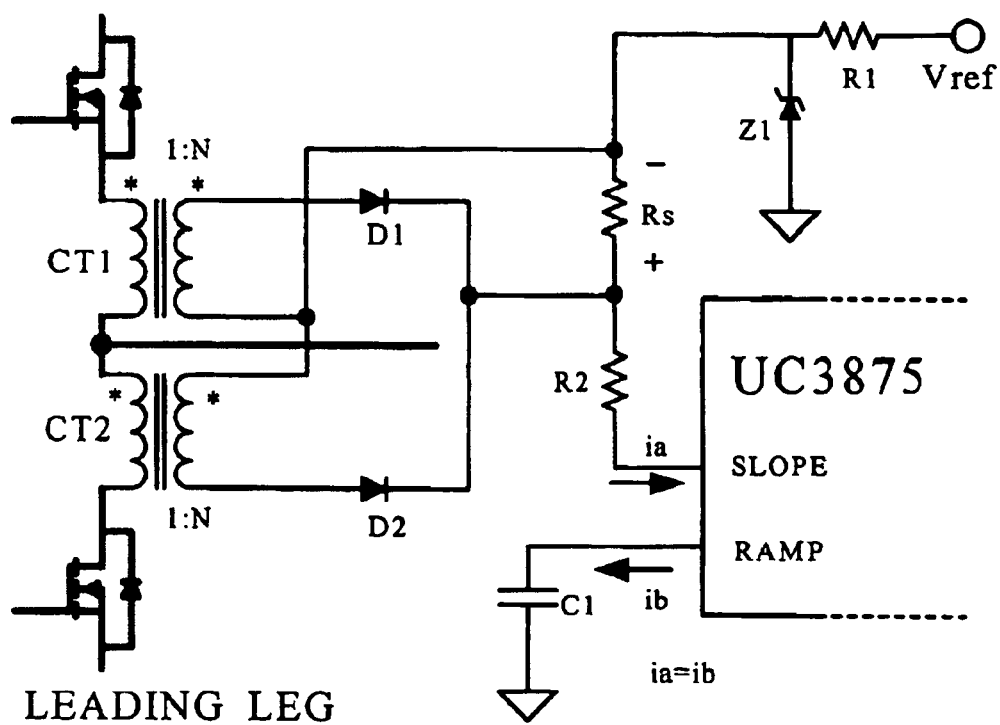
FIG. 6(b) is the schematic circuit diagram of the preferred embodiment of the controller of the phase-shifted full-bridge DC/DC converter of the present invention.

Please refer to FIG. 6, it shows the preferred embodiment of the phase-shifted full-bridge DC converter of the present invention. In which, FIG. 6(a) shows the main circuit configuration of the primary side of the transformer, Q1 and Q4 are the two switches, and CT1 and CT2 are two current detectors, and they can be employed to sample the primary side current of the transformer partially. The proposed controller circuit is realized in FIG. 6(b). The left-hand side portion of FIG. 6(b) is the realized connection of the two current detectors, and the current sampling signals finally will generate the voltage waveform A across Rs as shown in FIG. 4. The sum of the voltage A and the voltage across the zener diode Z1 is added to the resistor R2 and the current ia is generated accordingly, which flows into the slope terminal (the input terminal of mirror current) of the commonly used phase-shifted control IC UC3875. The output current of the RAMP terminal of the UC3875, ib, equals to ia, and ib will charge the capacitor C1 within the half switching period. The frequency of the discharge spike of the RAMP terminal is twice the switching frequency, and the pulse will let the voltage across the capacitor C1 decrease to zero value relatively quick, and restart the integral. The voltage waveform across C1 is very similar to the waveform D of FIG. 4, and the preferred embodiments are corresponded to the waveforms of FIG. 4 basically.

The preferred embodiments of the present invention are further described as follows:

1. employing the control block diagram of the preferred embodiment of the present invention as shown in FIG. 3 to suppress the DC component of the transformer belongs to the scope of the present invention, and the power converters and apparatuses employing the proposed controlling methods belong to the scope of the present invention too;
   (1) there is no mention of the current sampling in FIG. 3, but there are actually many ways for accomplishing the real current sampling: either through sampling the real current or through sampling and handling certain voltages having the equivalent effects;
   (2) in FIG. 3, the integrator could be a pure integrator, or in a pseudo-integrator form (for example, C1 coupled to a resistor in parallel as shown in FIG. 6 could be viewed as a pseudo-integrator form), the resetting signal of the integrator could be either controlled by a simpler way and has certain relationship with the switching frequency of the converter, or controlled by a much complex way, and the resetting value could be a non-zero value too;
   (3) the operational amplifier of the control loop of FIG. 3 for generating an amplified error signal is a traditional control circuit, it could be either a voltage-loop or a current-loop;
   (4) the comparator and the synthesizer in FIG. 3 could have many variations, e.g., the difference of E and C compared with B could be another alternative way, and the sum and difference generated by the synthesizer could be weighed by certain ratio instead of employing a 1:1 ratio;
   (5) the output signal of the comparator could be sent to other portions of the circuit according to the difference of the circuit;
   (6) the starting point of the compensation saw tooth wave might have a non-zero value, and the slope of it might be varied instead of having a certain value, the saw tooth wave could be generated through an integral of a voltage signal or a current signal theoretically, thus the input terminal could be at a different location, and the saw tooth wave could be generated through adding certain signal to signal A and send the resulting signal to the integrator;
   (7) the control method could be either an analog method or an digital method;
2. employing the control method in bridge-rectifier circuits to suppress the DC component of the primary side of the transformer belongs to the scope of the present invention, and the present invention could be used in the phase-shifted full-bridge DC/DC converter as shown in FIG. 1, employing the proposed controlling alternative in the push-pull converters also belongs to the scope of the present invention, and other applications which need to employ the proposed integral controlling method are included in the scope of the present invention too;
3. controlling the average value of the current to approach the zero value so as to suppress the DC component is proposed in the present invention, and controlling the average value of the current accurately are desired in certain applications which can be achieved by modifying the signal preprocessor in FIG. 3;
4. using the present invention in the power converters directly especially for suppressing the DC magnetic flux of the power transformer systems, employing the proposed controllers and methods in converters, and applying the proposed alternative to control the average value of current in other field all belong to the scope of the present invention.

In conclusion, the methods and apparatuses for suppressing the DC magnetic deflection of the transformer, and the power converters employing the proposed methods and controllers are proposed in the present invention so as to achieve a relatively higher efficiency of the transformer and the power converter.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A controller for suppressing a DC magnetic deflection of a transformer, comprising:
   a signal preprocessor for generating a current signal according to a sensed current of said transformer;
   an integrator electrically connected to said signal preprocessor for integrating said current signal and offering an integrated signal;
   a synthesizer electrically connected to said integrator for receiving and synthesizing said integrated signal and a slope compensation signal to generate a synthesized signal;
   an operational amplifier of a control loop for generating an amplified error signal; and
   a PWM comparator electrically connected to said operational amplifier and said synthesizer for comparing said amplified error signal and said synthesized signal and generating a PWM signal to turn on and off a switch of said transformer accordingly, thereby suppressing a DC current component of said transformer so as to suppress said DC magnetic deflection.

2. The controller according to claim 1, wherein said current of said transformer is a current on a primary side of said transformer.

3. The controller according to claim 1, wherein said control loop is one of a voltage-control loop and a current-control loop.

4. The controller according to claim 1, wherein said slope compensation signal is a saw tooth wave.

5. The controller according to claim 1, wherein said synthesizer is an adder.

6. The controller according to claim 1, used in a power converter.

7. A controller for suppressing a DC magnetic deflection of a transformer, comprising:
- a signal detector for detecting a current of said transformer;
- an integrator electrically connected to said signal detector for integrating said current and offering an integrated signal;
- an operational amplifier of a control loop for offering an amplified error signal;
- a synthesizer electrically connected to said operational amplifier for receiving and synthesizing said integrated signal and a slope compensation signal to generate a synthesized signal; and
- a PWM comparator electrically connected to said integrator and said synthesizer for comparing said integrated signal and said synthesized signal and generating a PWM signal to turn on and off a switch of said transformer accordingly, thereby suppressing a DC current component of said transformer so as to suppress said DC magnetic deflection.

8. The controller according to claim 7, wherein said current of said transformer is a current on a primary side of said transformer.

9. The controller according to claim 7, wherein said control loop is one of a voltage-control loop and a current-control loop.

10. The controller according to claim 7, wherein said slope compensation signal is a saw tooth wave.

11. The controller according to claim 7, wherein said synthesizer is a subtractor.

12. The controller according to claim 7, used in a power converter.

13. A method for suppressing a DC magnetic deflection of a transformer, comprising the steps of:
- detecting a current of said transformer to generate a current signal;
- integrating said current signal to offer an integrated signal;
- offering a slope compensation signal;
- synthesizing said integrated signal and said slope compensation signal to generate a synthesized signal;
- offering an amplified error signal of a control loop; and
- comparing said amplified error signal and said synthesized signal to generate a PWM signal so as to turn on and off a switch of said transformer accordingly, thereby suppressing a DC component of said transformer so as to suppress said magnetic reflection of said transformer.

14. A method for suppressing a DC magnetic deflection of a transformer, comprising the steps of:
- detecting a current of said transformer to generate a current signal;
- integrating said current signal to offer an integrated signal;
- offering an amplified error signal of a control loop and a slope compensation signal;
- synthesizing said amplified error signal and said slope compensation signal to generate a synthesized signal; and comparing said integrated signal and said synthesized signal to generate a PWM signal so as to turn on and off a switch of said transformer accordingly, thereby suppressing a DC component of said transformer so as to suppress said magnetic reflection of said transformer.

* * * * *